United States Patent [19]
Wallstén

[11] Patent Number: 4,477,243
[45] Date of Patent: Oct. 16, 1984

[54] THERMOFORMING APPARATUS

[76] Inventor: Hans I. Wallstén, Chemin De La LiSiére 6, CH-1018 Lausanne, Switzerland

[21] Appl. No.: 389,904

[22] Filed: Jun. 18, 1982

Related U.S. Application Data

[63] Continuation of Ser. No. 215,839, Dec. 12, 1980, abandoned, which is a continuation of Ser. No. 920,496, Jun. 29, 1978, abandoned.

[30] Foreign Application Priority Data

Jul. 15, 1977 [SE] Sweden ............................... 7708234

[51] Int. Cl.³ ........................ B29C 17/04; B29C 17/10
[52] U.S. Cl. .................................... 425/292; 264/553; 264/163; 425/302.1; 425/388
[58] Field of Search ................. 425/292, 302.1, 387.1, 425/388; 264/553, 163

[56] References Cited

U.S. PATENT DOCUMENTS

| | | | |
|---|---|---|---|
| 2,997,905 | 8/1961 | Larson | 83/171 |
| 3,175,027 | 3/1965 | Harrison | 264/163 X |
| 3,240,851 | 3/1966 | Scalora | 264/24 |
| 3,491,651 | 1/1970 | Pascoe | 90/11 |
| 3,755,522 | 8/1973 | Jope et al. | 425/388 X |
| 3,771,938 | 11/1973 | Pinto et al. | 264/553 X |
| 4,105,736 | 8/1978 | Padovani | 425/302.1 X |
| 4,215,607 | 8/1980 | Hudson et al. | 83/111 |
| 4,242,074 | 12/1980 | Lake | 425/292 |
| 4,277,996 | 7/1981 | Spengler | 83/171 |

Primary Examiner—Jan Silbaugh
Attorney, Agent, or Firm—Brumbaugh, Graves, Donohue & Raymond

[57] ABSTRACT

Apparatus for manufacturing articles is disclosed in which a preheated sheet of thermoplastic material is intermittently fed to present successive preheated portions of the sheet in a work station having a forming tool for forming articles in each successive sheet portion and a stamping tool for co-operating with the forming tool to stamp the formed articles from the sheet. The forming tool has a plurality of forming dies which are movable successively and cyclically into the work station for forming articles in respective successive sheet portions. After each forming operation the stamping tool is brought into engagement with a resilient counter-surface on the forming die to stamp from the sheet the articles formed by that die.

8 Claims, 5 Drawing Figures

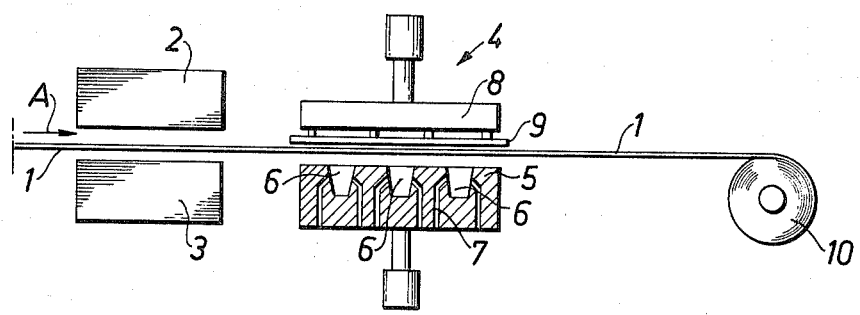
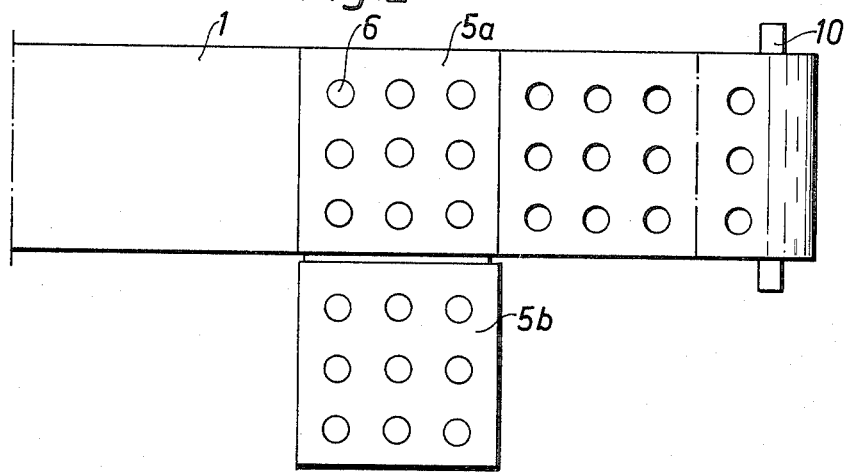
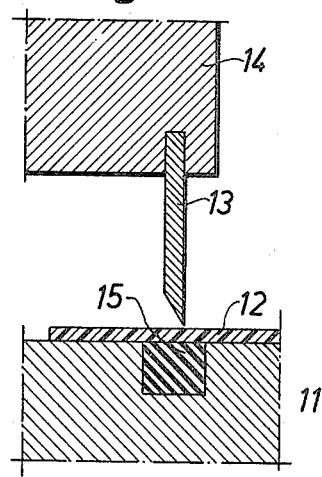
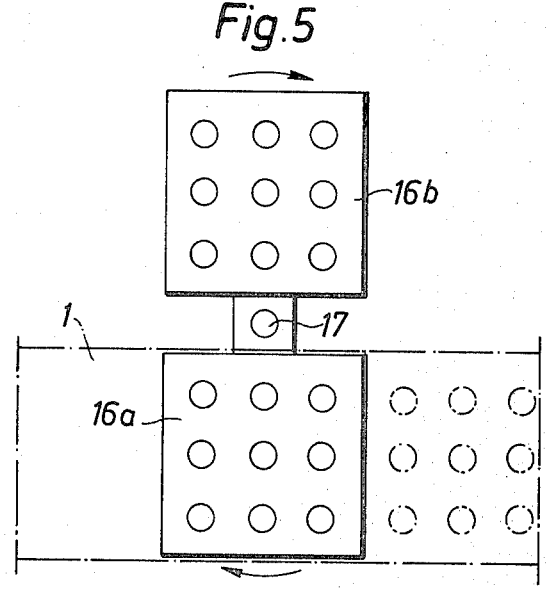

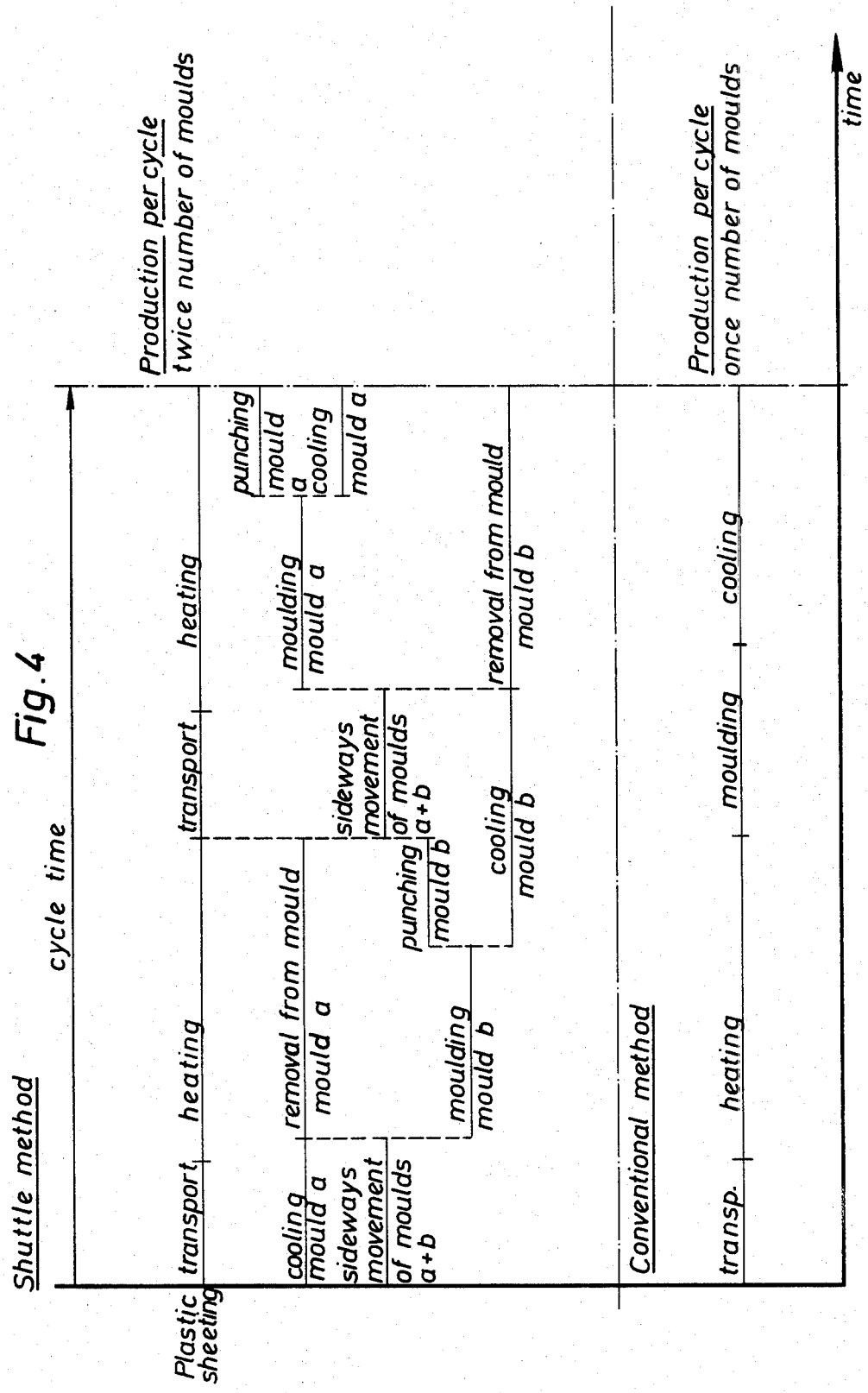

THERMOFORMING APPARATUS

This is a continuation of application Ser. No. 215,839 filed Dec. 12, 1980, and now abandoned, which is a continuation of U.S. application Ser. No. 920,496 filed June 29, 1978 and now abandoned.

BACKGROUND OF THE INVENTION

This invention relates to apparatus for manufacturing articles by thermoforming a heated sheet of thermoplastic material, the pre-heated sheet being intermittently fed to a work station and there subjected to thermoforming and stamping due to the cooperation of a forming tool and a stamping tool movable in relation to each other.

In the mass production of articles by thermoforming by means of vacuum and/or compression, manufacture is generally in accordance with two known methods. In both cases a roll of sheet material is used as the starting material. The sheet material is fed from a suitable reeling means, through a pre-heating zone to give the material a suitable temperature for the forming process. The sheet material heated in this way is then introduced into a forming and cooling zone where the requisite forming tool and cooling means are provided. In certain cases the forming tool may consist of a simple vacuum-forming tool and in other cases it may consist of a combined tool so that forming is performed with the aid of compressed air from one part of the tool and possibly with the help of vacuum applied in the other part of the combined tool. In certain cases only compressed air forming is used.

After forming and cooling, the articles thus formed are separated from the sheet of material and are then stacked, counted and so on in suitable manner in equipment designed for each specific requirement.

The separating and stacking in conjunction with or after the forming process is carried out in principle using two different methods. In the case of relatively thick sheets of plastic the separating and stacking are often performed in a separate station. An example of this is the mass production of disposable drinking mugs. In such a case a large number of mugs is often formed in each forming operation. After cooling, the material is transported suspended freely to a separating and stacking station. The separating is often performed as a complete punch and die stamping operation which requires two opposed tools aligned with great precision. To avoid the forces required for the stamping operation becoming unreasonably great, stamping is usually performed so that in each stamping stroke, only a single transverse row of the formed mugs is stamped out simultaneously. This means, for instance, that if 64 disposable mugs have been formed in 8 transverse longitudinal rows in relation to the sheet of material, the stamping tool will only stamp out one transverse row of 8 mugs at each stroke. In this case, therefore, the stamping tool must perform 8 strokes for each stroke of the forming die. This means that the forming and stamping stations must be synchronised so that the stamping tool operates at the correct point with as little deviation as possible. This is achieved, for instance, by producing small protrusions on the sheet of material during the forming operation. These protrusions are preferably applied along the edges of the sheet material and are effected so that a gripping means can push or pull forward a suitable amount of the sheet material between successive strokes of the stamping tool.

The articles stamped out in accordance with this system are often stacked directly in association with the stamping operation, one of the stamping tools moving the freed articles on to a collecting means of suitable type.

The method described above for mass production of thermoformed articles is suitable for relatively thick sheets of material, particularly as in this case compressed air must be used, possibly combined with vacuum, in order to achieve an acceptable production rate.

However, the method described above is not suitable for the mass production of thermoformed articles from relatively thin sheets of material. The primary reason is that it is difficult to achieve the requisite control over the feeding of the sheet material between the forming and stamping stations to enable acceptable accuracy in the stamping operation. The same problem exists with thermoplastic material which becomes distorted after the forming operation. It is difficult in this case also to achieve a good stamping operation with sufficient accuracy.

A different method is often used for mass production from thin sheet material, according to which the sheet material is fed forward in a stretched state by means of a single feeding arrangement through pre-heating, forming/cooling and stamping stations.

Obviously in this method the stamping operation must be synchronised with the forming operation and be performed in the same number of strokes as the forming operation. This means that the stamping tool must be as large as the forming die. This, on the other hand, entails the drawback that the stamping tool is large and requires considerable stamping force. There are thus considerable disadvantages and in mass production, i.e. when, for instance, a large number of articles is produced in a single forming stroke, it also means that the stamping tool will be extremely expensive and complicated. In some cases the problem has been solved by, instead of a complete punch and die stamping operation, performing the stamping with a tool consisting of steel blades or strips which stamp through the sheet material against a flat, solid support. In this case the whole contour is not severed and instead the stamping strips are arranged so that the material is not stamped all the way through at some points. In this way the products will remain suspended in the sheet material after stamping. However, they can be pushed out of the sheet material for stacking by suitble means in a separate stacking station arranged after the stamping station and operating synchronously therewith, after which the remains of the sheet material is coiled up.

The method described above has the advantage that it is particularly suitable for thin sheets of material or sheets which have a tendency to shrink during the forming process. The disadvantage, however, is that considerable stamping force is required here too since in this case the stamping tool is as large as the forming die. Another drawback is that it is not always possible to achieve the precision necessary in the stamping for some articles.

If great precision is required at the stamping stage, forming and stamping are performed in the same station, the forming die being built into the stamping tool. However, for stamping and forming by means of a combination of compressed air and vacuum, an extremely complicated tool is required which is expensive to manufacture. Since the pressure required is high the size of the tool is limited, which also limits its capacity. There are also problems in removing the articles after stamping. This is often done by pneumatic transport. This principle, therefore, is also complicated and is not suitable for the manufacture of thin-walled products as these cannot be transported or stacked pneumatically since the walls are too weak.

In this case of simultaneous vacuum-forming without compressed air and combined with stamping in the forming die, the tool becomes simpler and good precision in the stamping stage is also obtained, of course, but even in this case considerable stamping force is required and the tool is thus limited in its size. If a thin foil is to be formed to a thin-walled article, the same difficulties as mentioned above exist in dealing with the stamped-out article for stacking. This can be solved by not stamping completely through the plastic foil but, in a manner similar to that previously described with strip stamping, leaving a few points around the stamping contour so that the product is only partially stamped out. The article is then able to accompany the sheet of material out of the forming zone. The articles are then pushed out of the sheet material in suitable manner in conjunction with stacking. The method just described thus gives the advantage of good precision in the manufacture of thermoformed, thin-walled products from thin sheets of thermoplastic material. However, as mentioned, the drawback is that the number of articles formed simultaneously will be limited by the punching force prevailing and that the thin-walled, and thus possibly delicate, articles can only be separated from the sheet of material with a certain amount of difficulty without a risk of the articles being mechanically deformed. Furthermore, as is known, guide-strip stamping with only partial punching out results in small pieces of material being left at the points where the product is attached to the sheet material, which may be a drawback in many cases.

The object of the present invention is to provide apparatus suitable for mass production of theroformed, thin-walled, substantially cup-shaped products where the stamping operation must be carried out with precision and where the products are formed from a thin sheet of thermoplastic material.

A subsidiary object is to provide apparatus which require only negligible stamping force and thus enables the use of large tools, i.e. simultaneous stamping of a large number of articles.

A further subsidiary aim of the invention is to provide total stamping-out of the articles so that these need not be separated at a later stage, as well as a high-production rate since part of the cooling process should occur during and after stamping.

Finally, it is yet another subsidiary aim of the invention that the articles thus stamped out in conjunction with forming are easily accessible for transfer to a stacking and/or packing station.

SUMMARY OF THE INVENTION

According to the invention, there is provided apparatus for manufacturing articles by thermoforming in which a preheated sheet of thermoplastics is intermittently fed to present successive preheated portions of the sheet in a work station having a forming tool for forming articles in each successive sheet portion and a stamping tool for co-operating with the forming tool to stamp the formed articles from the sheet portion, in which method and apparatus the forming tool has a plurality of forming dies movable successively and cyclically into the work station for forming articles in respective successive sheet portions, and the stamping tool engages a resilient counter-surface of each forming die to stamp from each sheet portion the articles formed therein by the corresponding die.

Due to the stamping means acting against resilient counter-surfaces on the dies, this surface being preferably slightly wider than the working surfaces of the stamping tool, the sheet material is reliably stamped even if the positioning of the die concerned in the work station varies somewhat from case to case. Such deviation in positioning are impossible to avoid with movable forming dies. The apparatus according to the invention thus offers a decisive advantage. The use of a resilient counter-surface gives, for instance, the advantage that a slight inclination of the stamping tool at the moment of stamping can be taken up. With the use of known stamping methods using, for instance, stamping strips against a solid surface, a deviation of only a few 100ths of a millimeter may result in incomplete stamping and cause a stop in production in the continuous process. The apparatus according to the invention also gives the necessary precision in the stamping moment with respect to the position of the stamping tool. The use of heated stamping tools in the form of stamping strips involves difficulty in obtaining a sufficiently flat surface because of the varying longitudinal expansion caused by heat since it is practically impossible to maintain a constant temperature over the stamping tool. The use of resilient counter-surfaces according to the invention also enables this problem to be eliminated.

BRIEF DESCRIPTION OF THE DRAWINGS

In order that the invention may be readily understood, embodiments thereof will now be described, by way of example, with reference to the accompanying drawing, in which:

FIG. 1 is a partly sectioned, schematic side view of an apparatus embodying the invention;

FIG. 2 is a view from above of parts of the apparatus shown in FIG. 1;

FIG. 3 shows a detail of the means shown in FIGS. 1 and 2 on a larger scale;

FIG. 4 is an operating cycle diagram for the apparatus of FIGS. 1 to 3; and

FIG. 5 illustrates another embodiment of the invention.

DESCRIPTION OF THE PREFERRED EMBODIMENTS

In FIG. 1 a sheet of thin thermoplastic material passes between two heating devices 2 and 3 of the type normally used for thermoforming thermoplastic material. The heating may be performed, for instance, by means of infrared heating. Downstream of the heating devices 2, 3 in the direction of movement A of the sheet 1, there is located a work station comprising a vacuum-forming tool 5 with negative forms 6 for producing cup-shaped articles. The tool 5 is provided in conventional manner with vacuum channels 7 connected to a vacuum source (not shown). The tool 5 is movable horizontally and vertically by means of suitable mechanisms (not shown). Above the forming tool 5 and on the other side of the sheet of material 1 is a stamping tool 4 consisting of a plate 8 with stamping strips 9 attached thereto and directed towards the sheet material. The strips 9 are kept hot with the help of heating elements in the plate 8. The stamping tool 4 is movable vertically by means of suitable mechanisms (not shown). After leaving the work station the sheet of material 1 is wound onto a reel 10.

FIG. 2 shows the apparatus of FIG. 1 as seen from above. For the sake of clarity the stamping tool 4 has been omitted. As can be seen from FIG. 2, the forming tool 5 comprises two identical vacuum-forming dies 5a and 5b which are attached to each other. In the position shown in FIG. 2 the sheet material 1 is in position over the die 5a. The two interconnected dies 5a and 5b are movable by means of a suitable mechanism in a horizontal direction perpendicular to the direction A of movement of the sheet material 1.

The manufacture of cup-shaped, thin-walled articles takes place in the apparatus shown in FIGS. 1 and 2 in the following manner, starting from the position of FIG. 2 where the die 5a is in an operative position beneath the sheet 1. The pre-heated sheet 1 is fed intermittently by feeding means (not shown), for instance in the form of feeding chains which preferably cooperate with means arranged along the edge of the sheet material, so as to present preheated sheet portions in the work station. When a predetermined length of pre-heated material has been fed forward into position between the forming tool 5 and the stamping tool 4, there is a brief pause in the feeding. At this moment the die 5a is moved vertically upwards towards the sheet 1. When an upper position of the die 5a has been reached, a vacuum is applied and forming of the sheet 1 in the forms 6 takes place. Next, the stamping tool 4 is lowered at a suitable moment towards the die 5a which is provided with a resilient counter surface for engagement by the strips 9 of the tool 4. The actual stamping process effected between the strips and the counter-surfaces will be described in detail hereinafter. As will be shown later, the stamping can be performed with very low stamping force and, furthermore, occurs instantaneously. Immediately after the stamping operation the stamping tool is returned to its original position by an upward vertical movement.

The stamping strips 9 sever the formed articles completely from the sheet 1 so that the freed articles are retained in the die 5a due to the vacuum. The articles therefore accompany the die 5a on a subsequent downward movement and in a following horizontal movement of the die 5a which carries the die 5a to one side of the sheet material 1. On completion of the horizontal movement of die 5a the die 5b has at the same time assumed the operating position beneath the sheet in place of the die 5a. The separated articles in the die 5a are now easily accessible and can be simply removed from the die 5a by suitable lifting means provided at the one side of the sheet 1. Such a lifting means may be designed in many ways. For instance, the articles may be removed from the die 5a by means of vacuum and placed on a suitable stacking means. In order to facilitate removal compressed air may be forced between the forming die and the articles therein. This can easily be effected by introducing the compressed air via the vacuum channels of the die.

When the die 5b has reached the operating position under the sheet 1 it is moved towards the sheet, whereupon a new cycle of operation is started for the die 5b and the stamping steel 4 in exactly the same manner as described earlier in connection with the die 5a. The only difference is of course that after forming and stamping of the articles the die 5b is moved to the other side of the sheet of material from that to which the die 5a is moved after its forming and stamping operation.

The forming dies 5a and 5b may be so mechanically connected that all vertical and horizontal movements are performed by both simultaneously. It is however, possible for the dies 5a and 5b to perform their vertical movements separately.

Optimal use of the production capacity of the arrangement can be obtained by suitable timing of the heating, forming, stamping, cooling and transportation operations with respect to each other. Thus the stamping operation can be fitted into the operating cycle at the most appropriate moment since this is performed during or after the forming. If stamping is performed while the forming die is still under vacuum, the articles are firmly held in position which contributes to extremely high precision in the stamping process. In the same way cooling may be effected not only during the forming process with the forming die in its uppermost position, but may also occur after stamping and even while the die is being moved sideways since in the apparatus embodying the invention the formed objects may remain in their die during the subsequent operations of feeding forward more material and forming in the other die.

FIG. 3 shows a detail of the apparatus embodying the invention. Here a part of a forming die 5a, 5b is designated 11 and a part of the sheet of material to be stamped is designated 12. A stamping strip of the stamping tool is designated 13. The strip 13 is embedded in the heated bottom plate, only shown in part at 14. A groove 15 in the upper surface of the forming die 11 is filled with resilient material such as silicon rubber, so that, when the strip 13 is lowered towards the sheet of material 12, the heated strip will cut through the material. It has been found that with such a resilient counter-surface for the stamping strip this will cut through the material without requring any substantially stamping force.

Moreover, it has been found that the required accuracy in the flatness of the stamping strip is very low if the counter-surface is yielding. The stamping strip can therefore be easily and quickly fitted without having to be carefully aligned. It has been found that extremely clean cuts can be obtained with the arrangement shown in FIG. 3 while at the same time the stamping force, as mentioned above, is very slight.

It has been found that the apparatus for manufacturing vacuum-formed products from a thin thermoplastic film in accordance with the invention enables manufacture with extremely high production capacity. By way of example it may be mentioned that when manufacturing deep, bowl-shaped, disposable inserts for cooking vessels in accordance with U.S. Pat. No. 4,164,174 it is possible to achieve an extremely high production rate which is unmatched by any known method. For example, it may be mentioned that such bowl-shaped inserts with a diameter of about 200 mm and a depth of about 90 mm can be formed from an HD HM polythene film with a thickness of 0.1 m and using a forming tool having 9 forms in each die, the forms being arranged in each tool in 3 rows each of 3 forms.

Such inserts have a wall-thickness at the top edge of about 0.10 mm, which is desirable in this case in order to give the edges a certain rigidity. At the thinnest parts near the bottom a thickness of about 0.02 mm has been measured. This is also desirable since the walls and bottom of the inserts should be as thin as possible so that they can easily be screwed up after use and also so that the inserts have a high thermal conductivity.

In the example mentioned optimal use of the capacity of the apparatus can be achieved by a suitable choice of the various cycles. A double-operating forming tool results in substantially doubled production capacity. If with a forming tool consisting of a single die it is possible to achieve a total of 20 forming and stamping cycles a minute, it has been found that with the double-operating forming tool it is possible to achieve 40 cycles a minute. This is because part of the operating cycle of the die occurs at the side of the sheet of material at the same time as the forming and stamping operations of the other die are being performed.

FIG. 4 illustrates a possible operating cycle for apparatus embodying the invention. At the bottom of FIG. 4 there is illustrated the sequence of operations for hot-forming in accordance with a known method in which the individual distances indicated substantially correspond to the times required for transport, heating, forming and cooling. At the top of FIG. 4 there is illustrated the sequence of corresponding operations in a method embodying the invention, referred to hereinafter as the shuttle method and employing two forming dies A and B. It is clear from the operating diagram of the shuttle method that, for instance, the cooling of die A takes place partly during the sideways movement of dies A and B. At the same time the plastic sheeting is fed along. While the sheeting is being heated, finished products are being removed from die A and vacuum-forming is simultaneously being performed in die B.

During the latter part of this stage, die B is stamped while at the same time cooling is initiated. During the next feed stage of the plastic film the dies A and B move sideways. During the susbsequent heating stage of the plastic film the finished products are removed from die B at the same time as forming, stamping and cooling take place in die A. It is thus clear from the skeleton diagram in FIG. 4 that practically double production can be achieved by this shuttle method embodying the invention.

FIG. 5 illustrates schematically another embodiment of the invention in which two interconnected forming dies are arranged to pivot about a central point 17. The dies designated 5a and 5b in FIG. 2 are designated 16a and 16b in FIG. 5. In the position shown in FIG. 5 the material 1 is over the die 16a for forming and stamping. When this operation has been completed the die swings about its pivot 17 so that the die 16b comes into position below the material 1. Both dies are arranged to be moved vertically during the forming process, in the same manner as the dies 5a and 5b in FIG. 2.

The embodiment according to FIG. 5 has the advantage that the finished articles need only be removed from the dies 16a and 16b on one side of the sheet of material. Of course, there are other conceivable of embodiments of the invention operating on the same principle as that illustrated in FIG. 5, the dies being arranged like a carousel. For instance, it is possible to imagine three or more interconnected dies pivotably arranged.

A capacity of about 20,000 bowl-shaped disposable inserts per hour has been achieved using the embodiment of the method just described. It has also been possible to stack the articles directly in a simple stacking means placed at the side of the machine.

As mentioned previously, the present invention enables vacuum-forming and stamping to be performed using very little force. This is a great advantage since the whole forming machine can then be very simple, having relatively slight dimensions in comparison with the extremely clumsily dimensioned arrangements required for traditional vacuum-forming.

This also results in low tool costs, which further justifies the use of double tools—a prerequisite for performance of the invention.

As an example it may be mentioned that when manufacturing disposable articles of the type described in die tools with 9 articles by means of traditional vacuum forming with a combination of compression and vacuum, the calculated force is approximately 6 tons on the form at an over-pressure of 2 atmospheres and 8.5 tons at an over-pressure of 3 atm. With the use of vacuum alone, there is no pressure at all on the tool.

The apparatus thus requires extremely little stamping force. Stamping in traditional manner with steel strips against a non-yielding counter-surface requires about 15 kgf per centimeter of length of the stamping strip in the example above. This would give a total stamping force of about 9000 kgf. With the use of heated stamping strips with yielding counter-surfaces in the form of rubber, for instance, in accordance with the invention, it has been found in said example that the corresponding stamping force required is about 300 kgf, i.e. 0.5 kgf/cm along the length of the stamping strip. The stamping force is required has in this case been reduced to about 1/30. It was also found that stamping was performed right through the material even though the stamping strips had not been aligned with any great precision on the bottom plate.

In apparatus embodying the invention a stamping force of not more than 2.0 kgf/cm length of the stamping strip is preferably used. The stamping strips are heated to a temperature suitable for the thermoplastic material concerned, preferably 150°–275° C. It has been found advisable to use resilient material having an elasticity of not less than 30 P & J and preferably more than 100 P & J, particularly when using stamping strips which are not very accurately aligned. If silicon rubber is used, for instance, with a sheet of thin polyethylene and a stamping tool temperature of about 200° C., a silicon rubber with a hardness of about 160 P & J has been used with extremely satisfactory results.

Thus an extremely high capacity can be achieved by means embodying the present invention, partly due to the fact that each die can be made quite large at relatively low cost and may contain forms for a large number of articles while using extremely little force for the forming and stamping operations, and partly due to optimal use being made of the work cycle by the use of several forming dies. It may be mentioned that, when using traditional equipment for the production of bowl-shaped products in accordance with the example described above, it is hardly possible to produce more than four bowls power stroke which, with 20 strokes a minute, corresponds to a production rate of 4800 units an hour. In this example, therefore, apparatus embodying the invention gives four times the production rate in spite of the fact that the required apparatus is compact in design, requires little space and is relatively cheap to manufacture.

Vacuum-forming technique has been used in the embodiments shown and described above but the invention is of course not limited to this but can be used for all types of thermoforming.

I claim:

1. In apparatus for continuous vacuum forming comparatively thin-walled articles from an intermittently moved sheet of thermoplastic material in a forming station comprising stamping means having stamping blades attached thereto and projecting therefrom in the direction of said sheet with their cutting edges spaced therefrom and means for heating said blades, said stamping means being disposed on one side of the sheet and being displaceable from a rest position away from said sheet to a working position adjacent said sheet, vacuum forming means on the opposite side of said sheet and comprising at least two vacuum forming dies, each displaceable alternately and successively from a molding location in substantial registry with said sheet in the forming station to a molded article discharge location out of registry with said sheet, each said forming die having a plurality of die molds with flat coplanar surfaces substantially parallel to said sheet having formed therein mold openings facing said sheet when at said molding location, each mold opening being bounded by a resilient counter-surface wider than a stamping blade and in substantial registry therewith when the mold in which it is formed is at said molding location, said stamping means being arranged so that, when displaced to the working position and during the stamping operation, the heated blades thereof engage the sheet and press it against said counter-surfaces for stamping and severing said articles from said sheet before the dies containing the articles are displaced from the molding location to the article discharge location, and means for displacing said stamping means to the working position and for carrying out the stamping operation with very little stamping force, whereby the molded articles can be completely severed from said sheet with said very little stamping force.

2. Apparatus as defined in claim 1 in which each die comprises a plurality of rows of die molds, and means is provided for selectively applying vacuum to the molds of each die, when at said forming station, both during the forming operation and also during the stamping operation to prevent movement of the formed articles during the latter.

3. Apparatus as defined in claim 2 in which means is provided for maintaining vacuum in said molds during movement of each die from said molding location to said discharge location.

4. The apparatus of claim 1, wherein each said counter-surface is constituted by a groove filled with resilient material.

5. The apparatus of claim 4, wherein said resilient material is silicone rubber.

6. The apparatus of claim 4, wherein said resilient material has elasticity which is not less then 30 P & J.

7. The apparatus of claim 6, wherein the elasticity of said resilient material exceeds 100 P & J.

8. The apparatus of claim 1, in which cooling means is provided to cool the dies both in said molding location and discharge location and during movement between said locations.

* * * * *